United States Patent [19]
Lindeman

[11] 3,947,076
[45] Mar. 30, 1976

[54] LUBRICATING BEARING AND BRACKET MOUNTING

[75] Inventor: Richard Jay Lindeman, Elmwood Park, Ill.

[73] Assignee: Illinois Tool Works Inc., Chicago, Ill.

[22] Filed: Dec. 19, 1974

[21] Appl. No.: 534,267

[52] U.S. Cl. .................. 308/103; 308/18; 308/100; 308/115; 308/116
[51] Int. Cl.² F16C 1/24; F16C 13/02; F16C 33/66; F16H 55/36
[58] Field of Search ........... 308/18, 92, 94, 99, 100, 308/101, 102, 103, 104, 108, 109, 111, 112, 113, 115, 116, 117, 118

[56] References Cited
UNITED STATES PATENTS

| | | | |
|---|---|---|---|
| 591,489 | 10/1897 | McPhail | 308/115 |
| 669,655 | 3/1901 | Olinger | 308/109 X |
| 707,338 | 8/1902 | Loree | 308/103 X |
| 2,751,264 | 6/1956 | Wood | 308/104 |

Primary Examiner—Albert J. Makay
Assistant Examiner—Howard Beltran
Attorney, Agent, or Firm—Jack R. Halvorsen; R. W. Beart

[57] ABSTRACT

A pulley is provided with a bi-ended, hollow tube bearing, bracket mounting assembly. The bearing tube is slit from one end to the other, and one of the lips thus formed is displaced inwardly in chordal relationship to the balance of the bearing along all or a portion of the bearing axial length. This displaced lip catches drippings from a lubricant-impregnated bushing, and returns them to the bushing.

7 Claims, 6 Drawing Figures

U.S. Patent   March 30, 1976   3,947,076
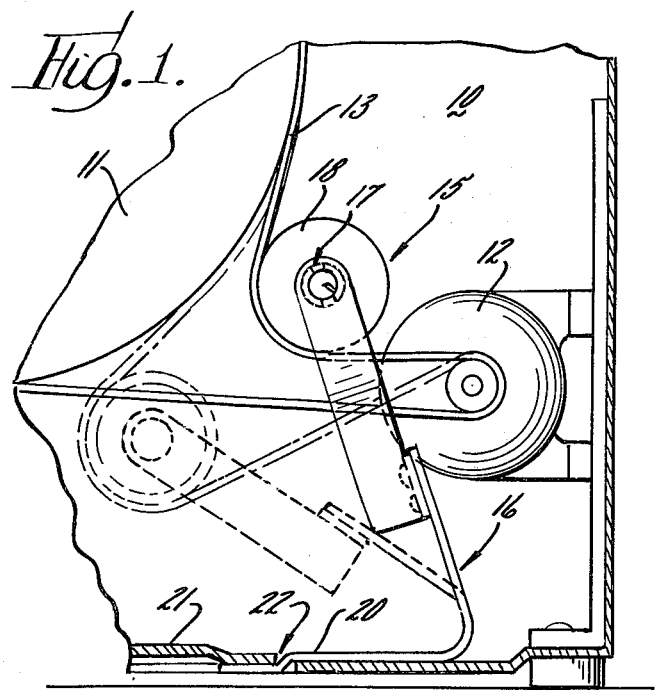
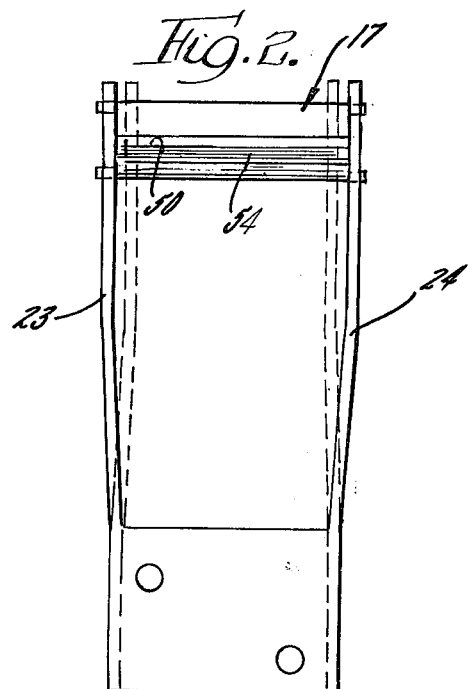
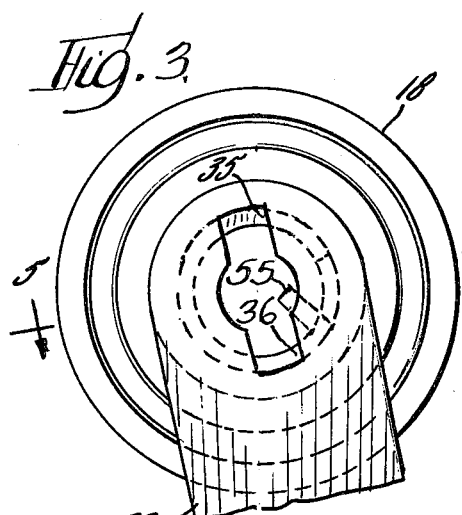
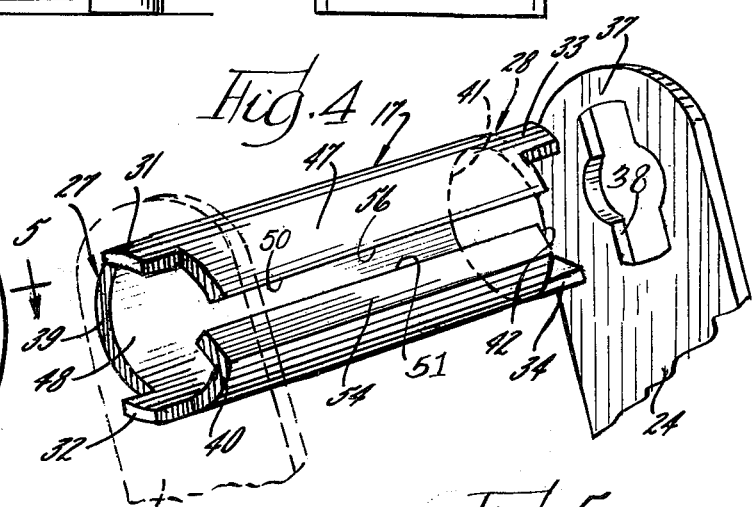
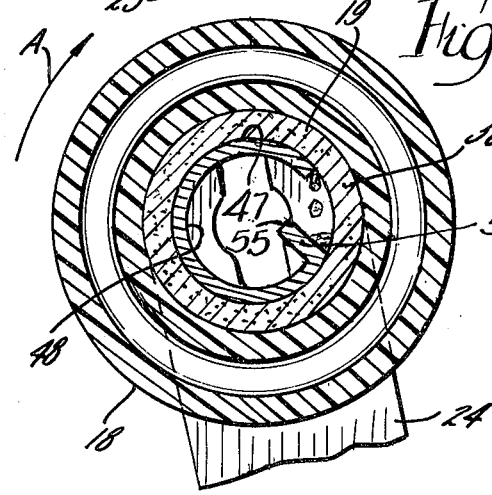
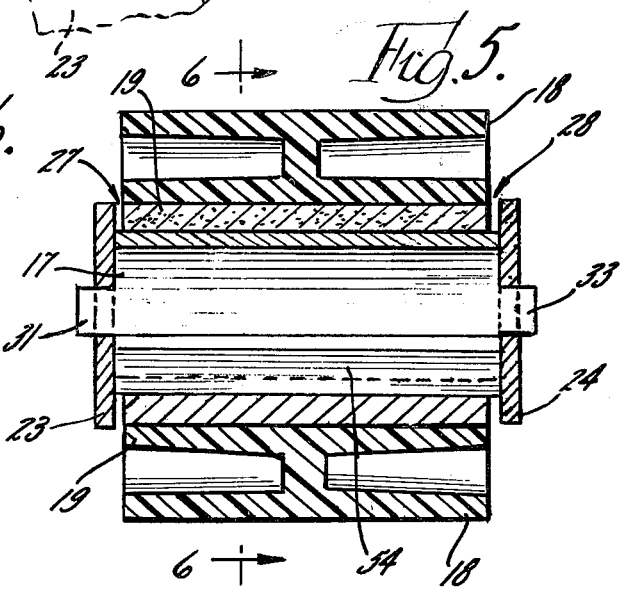

LUBRICATING BEARING AND BRACKET MOUNTING

BACKGROUND OF THE INVENTION

This invention relates generally to pulleys used in washing machines and the like, and more particularly concerns a low-cost, rugged pulley bearing adapted to maintain pulley lubrication.

It is the general object of this invention to provide a take-up or idler pulley at a low finished cost which features relatively permanent lubrication between a rotating pulley member and a stationary pulley bearing, thereby providing long service life.

It is a more specific object of the invention to provide a pulley of the type described wherein lubrication between the pulley member and the bearing is assured even when the pulley mechanism is installed in a location making subsequent lubrication difficult or impossible.

Yet another object of the invention is to provide a pulley mechanism for use in washing machines, clothes dryers, and like machinery which does not require lubrication after installation, and which discourages lubricant leak or drip outside the pulley.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is an elevational view showing the novel pulley and bearing as they appear when installed in a typical clothes dryer or like machine;

FIG. 2 is an elevational view showing the pulley bearing as it appears when installed upon a bearing support fork member;

FIG. 3 is a fragmentary view showing, in further detail, the pulley wheel, bearing, and bearing support fork;

FIG. 4 is a perspective view showing in yet further detail the novel pulley bearing member;

FIG. 5 is a sectional view taken substantially in the plane of line 5—5 in FIG. 3 and showing in yet further detail the pulley parts; and FIG. 6 is a sectional view taken substantially in the plane of line 6—6 in FIG. 5 and showing in yet further detail the interrelationship of the pulley parts.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Turning first to FIG. 1, there is shown a typical machine or device utilizing the present invention, such as a clothes dryer 10 which includes a clothes-containing drum 11. The drum is rotated by a motor 12 which powers a belt 13 looped over the drum 11. To tension the belt 13, an idler or take-up pulley 15 is provided. In general, this pulley mechanism can be considered to include a bearing support fork 16, a novel bearing 17 (see FIG. 2) and a pulley wheel 18 rotatably disposed upon the bearing 17. An oil-impregnated bushing 19 formed of known material is fixed, as by press-fitting, within the wheel 18.

The bearing support fork member 16 is secured at a base 20 to a convenient stationary machine frame member 21, as by a slide connection 22, and its other end is provided with two tine members 23 and 24 as shown in FIG. 2. In its initial or relaxed position, shown in dotted lines in FIG. 1, the bearing support fork 16 carries the pulley wheel 18 in a maximum slack take-up position. However, when the turn belt 13 is passed over the pulley wheel 18, the bearing support 16 is resiliently pulled into the position shown in solid lines in FIG. 1, but continues to urge the belt 13 and pulley wheel 18 back into the maximum slack take-up position against the action of the belt member 13. Before the bearing 16 is mounted between the tines 23 and 24, the tines assume the inwardly located unstressed positions shown in dotted lines in FIG. 2, but when the bearing 17 is disposed between them, the axial length of the bearing forces the tines 23 and 24 into the outwardly splayed positions shown in solid lines in FIG. 2.

The pulley wheel 18 and bushing 19 are mounted between the bearing support fork tines 23 and 24 by the novel bi-ended, one-piece cylindrical bearing 17. Low bearing manufacturing and assembly cost is encouraged by providing each bearing end 27 and 28 with two axially protruding fingers 31–34 inclusive which are adapted to engage corresponding slots 35–38 formed in the respective abutting tines 23 and 24. These fingers 31–34 are separated by recessed surfaces 39–42 formed to abut the tines 23 and 24. Together, the tines, fingers and abutting bearing end surfaces form an economical yet dimensionally accurate and sturdy interconnection between the support fork 16 and the bearing 17 as shown in FIGS. 2, 4 and 5. It will be understood that other bearing-bearing support interconnections can be provided without departing from the scope of the present invention.

In accordance with one aspect of the invention, this bearing 17 permits the pulley 18 and bushing 19 to be easily assembled over the bearing, and accommodates slight undulations in the inner surface of the bushing 19 during pulley operation. To this end, the illustrated bearing 17 is formed as a hollow tube. The tube is provided with a slit 45 extending from one bushing end 27 to the other end 28, and from an outer bearing surface 47 to an inner surface 48. This slit forms generally opposed bearing lips 50 and 51.

In accordance with the invention, lubricant drippings from the oil-impregnated bushing 19 are trapped by the bearing 17 and are returned to the bushing, thereby prolonging the term of proper pulley lubrication and preventing undesirable lubricant accumulation or drip. To this end, a portion 54 of one lip 51 is displaced radially inwardly in chordal relationship to the balance of the bearing to catch drippings from the bushing 19, and to form an inclined shelf or channel along which the drippings return to the bushing. In the illustrated embodiment, the tip 55 of the displaced portion 54 is offset more than the width of the bearing tube, i.e., more than the radial distance between the inner surface 48 and the outer surface 47 of the bearing to maximize oil-catching and retention capabilities.

To discourage lubricant collected by the displaced portion 54 from dripping outside the pulley, the support tines 23 and 24 can be formed to cover the bearing ends and form ends to the oil-retaining trough formed by the lip 51 and the adjacent portions of the bearing 19.

In the preferred embodiment, the displaced portion 54 is provided on the second lip 51, or that lip which is lastly intercepted during pulley rotation. That is, when the pulley 18 is expected to rotate in the direction indicated by the arrow A in FIG. 6, the bearing 19 initially passes over the first lip 50, and then over the second lip 51. Under these circumstances, the displaced portion 54 is formed on the subsequently intercepted lip 51. This arrangement enhances the oil-catching and oil-returning capabilities of the invention.

The invention is claimed as follows:

1. A fixed bearing for rotatably supporting a pulley and lubricated bushing or the like, comprising a bi-ended, hollow cylindrical tube slit from an outer surface to an inner surface and from one end to the other in a direction parallel to the tube axis to form generally opposed lips, at least a portion of one lip being connected to an axially extending flange means which is disposed inwardly from said lip in chordal relationship to the balance of the bearing, the free edge of said flange means extending inwardly more than the radial distance between the inner and outer surfaces of said hollow bearing to catch oil drippings and return them to the pulley bushing.

2. A bearing according to claim 1 which is formed of a single sheet metal piece.

3. A bearing according to claim 1 wherein said pulley and oiled bushing rotate over said bearing in a predetermined direction and intercept a first lip initially and a second lip subsequently during said rotation and wherein said displaced lip portion is formed on the lip subsequently intercepted.

4. A bearing according to claim 3 wherein said tube is provided with orienting means adjacent at least one end thereof for cooperatively engaging mounting means to orient said lips in a predetermined manner within an imaginary quadrant defined by vertical and horizontal planes falling on the axis of said tube, said inwardly disposed flange lying gravitationally below said other lip with said other lip and a portion of said flange lying on a plane parallel to said vertical plane and with the lowest edge of said flange being located adjacent said bushing to return all oil dripings onto said bushing.

5. An idler pulley assembly for the complimental biasing and acceptance of a belt, said assembly comprising a spring urged bearing support fork, a bearing mounted on the support fork, means for orienting said bearing relative to said support fork, and a complimentary pulley wheel journalled on the bearing, the bearing included a bi-ended, hollow cylindrical tube slit from an outer surface to an inner surface and from one end to the other in a direction parallel to the tube axis to form generally opposed circumferentially spaced lips, at least a portion of one lip being connected to axially extending flange means which is disposed inwardly from said lip in chordal relationship to the balance of the bearing, the free edge of said flange means extending inwardly more than the radial distance between the inner and outer surfaces of said hollow bearing to catch oil drippings from said pulley and return them to the pulley.

6. An assembly according to claim 5 including a bushing member fixed within said pulley member and journalled upon said bearing member, said bushing being formed of lubricant-impregnated material.

7. An assembly of the type claimed in claim 5 wherein said tube and fork orienting means includes a notch and tang means arrangement between said fork and said bearing which orients said lips in a predetermined manner within an imaginary quadrant defined by vertical and horizontal planes falling on the axis of said tube, said inwardly disposed flange lying gravitationally below said other lip with said other lip and a portion of said flange lying on a plane parallel to said vertical plane and with the lowest edge of said flange being located adjacent said bushing to return all oil drippings onto said bushing.

* * * * *